(12) United States Patent  (10) Patent No.: US 7,862,941 B2
Gade et al.  (45) Date of Patent: Jan. 4, 2011

(54) HYDROGEN EMISSIONS CONTROL DURING UP-TRANSIENTS AND CATHODE PULSING

(75) Inventors: Prasad Gade, Webster, NY (US); Jon R. Sienkowski, Rochester, NY (US); Abdullah B. Alp, West Henrietta, NY (US)

(73) Assignee: Gm Global Technology Operations, Inc., Detroit, MI (US)

( * ) Notice: Subject to any disclaimer, the term of this patent is extended or adjusted under 35 U.S.C. 154(b) by 735 days.

(21) Appl. No.: 11/669,890

(22) Filed: Jan. 31, 2007

(65) Prior Publication Data

US 2008/0182142 A1    Jul. 31, 2008

(51) Int. Cl.
    *H01M 8/04* (2006.01)
(52) U.S. Cl. ...................... 429/428; 429/430
(58) Field of Classification Search .............. 429/26
    See application file for complete search history.

(56) References Cited

U.S. PATENT DOCUMENTS 6,821,668 B1 * 11/2004 Perry et al. .................. 429/38

2005/0123813 A1 * 6/2005 Matoba et al. ............... 429/24

* cited by examiner

*Primary Examiner*—Dah-Wei D Yuan
*Assistant Examiner*—Jacob Marks
(74) *Attorney, Agent, or Firm*—John A. Miller; Miller IP Group, PLC

(57) ABSTRACT

A fuel cell system that controls an anode exhaust gas bleed during power up-transients. The fuel cell system includes a by-pass valve that allows compressor air to by-pass the fuel cell stack and be directly emitted into the cathode exhaust gas stream. The system detects a power up-transient by monitoring the rate of closing of the by-pass valve and the rate of change of an increase in the compressor airflow set-point. If these parameters pass a certain threshold, then the system determines that a power up-transient is occurring, and prevents an anode exhaust gas bleed for a predetermined period of time. If cathode pulsing is occurring where power up-transients come one after another, then the system will continuously reset the time period for preventing the anode exhaust gas bleed until a second time limit is reached, where the bleed is then forced.

19 Claims, 1 Drawing Sheet

HYDROGEN EMISSIONS CONTROL DURING UP-TRANSIENTS AND CATHODE PULSING

BACKGROUND OF THE INVENTION

1. Field of the Invention

This invention relates generally to a system and method for controlling an anode exhaust gas bleed and, more particularly, to a system and method for controlling an anode exhaust gas bleed during power up-transients and cathode pulsing.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air coming out of the stack is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

For automotive applications, it typically takes about 400 fuel cells to provide the desired power. Because so many fuel cells are required for the stack in automotive fuel cell system designs, the stack is sometimes split into two sub-stacks each including about 200 fuel cells because it is difficult to effectively provide an equal flow of hydrogen gas through so many fuel cells in parallel.

It has been proposed in the art to provide stack order switching or anode flow shifting in a fuel cell system that employs split stacks. Particularly, suitable valves and plumbing in the system are provided so that during flow shifting the anode gas exiting a first sub-stack is sent to the anode side of a second sub-stack, and the anode gas exiting the second sub-stack is sent to the anode side of the first sub-stack in a cyclical manner. During an anode exhaust gas bleed, the anode gas exiting the second sub-stack is sent to the system exhaust.

The MEAs are porous and thus allow nitrogen in the air from the cathode side of the stack to permeate therethrough and collect in the anode side of the stack, referred to in the industry as nitrogen cross-over. Nitrogen in the anode side of the fuel cell stack dilutes the hydrogen such that if the nitrogen concentration increases beyond a certain percentage, the fuel cell stack becomes unstable and may fail. It is known in the art to provide a bleed valve to remove nitrogen from the anode side of the stack.

The anode exhaust gas that is periodically bled typically includes a considerable amount of hydrogen. Because the hydrogen will mix with air if it is vented to the environment, a potential combustible mixture may occur that provides obvious safety concerns. It is known in the art to direct the bled gas to a combustor to burn most or all of the hydrogen therein before the bled gas is exhausted to the environment. However, the combustor adds a significant cost, weight and complexity to the fuel cell system, which is undesirable.

It is also known in the art to eliminate the combustor and directly mix the bled gas with the cathode exhaust gas. If the bled gas is directly mixed with the cathode exhaust gas without control, the amount of hydrogen in the bled gas is unknown. A hydrogen concentration sensor can be provided in the cathode exhaust gas line after the mixing point with the bled gas to detect the concentration of hydrogen. The hydrogen concentration sensor would provide a signal to the controller during the bleed indicative of the concentration of hydrogen in the mixed exhaust gas. If the concentration of hydrogen was too high, the controller would increase the speed of the compressor to provide more cathode exhaust air to lower the concentration of hydrogen. If the compressor was unable to effectively keep the concentration of hydrogen below the safe limit for the stack load, then the controller would have to close the bleed valve or reduce the anode pressure. However, the hydrogen sensor would have to be inexpensive and be able to withstand the humidity of the exhaust gas. Currently, known hydrogen concentration sensors are unable to provide these requirements.

Algorithms are typically employed to estimate the concentration of nitrogen in the anode side of the stack using several input parameters based on the operating conditions of the system, and trigger an anode exhaust gas bleed when the estimated nitrogen concentration reaches a predetermined level. During an anode gas bleed, the pressure is controlled across the bleed control valve.

Controlling the hydrogen concentration in the system exhaust during anode exhaust gas bleeding is particularly troublesome during power up-transients of the stack and cathode pulsing. Before a power up-transient or cathode pulsing, the anode exhaust gas is typically bled in short pulses into the cathode exhaust gas upstream from a cathode by-pass valve that allows the cathode air to by-pass the fuel cell stack. At low current density, the cathode exhaust gas flow is not sufficient to dilute the anode exhaust gas hydrogen to be below a desired concentration, and thus, air is added to the cathode exhaust from the compressor through the by-pass valve. During power up-transients or cathode pulsing, air is redirected from the by-pass valve to the cathode inlet so that the maximum amount of air is sent to the stack for providing the power up-transient. During this time period, an anode bleed may be commanded to reduce the nitrogen concentration, where the cathode exhaust air may not be sufficient to dilute the hydrogen. Further, the compressor is not able to provide additional air through the by-pass valve because its capacity is necessary for meeting the power up-transient.

SUMMARY OF THE INVENTION

In accordance with the teachings of the present invention, a fuel cell system is disclosed that controls an anode exhaust gas bleed during power up-transients and cathode pulsing. The fuel cell system includes a by-pass valve that allows compressor air to by-pass the fuel cell stack and be directly emitted into the cathode exhaust gas stream. The system detects a power up-transient by monitoring the rate of closure of the by-pass valve and the rate of change of an increase in the compressor airflow set-point. If both the rate of closing of the by-pass valve and the rate of change of the compressor airflow set-point pass a certain threshold, then the system determines that a power up-transient is occurring, and prevents an anode exhaust gas bleed for a predetermined period of time. If cathode pulsing is occurring where power up-transients come one after another, then the system will continuously reset the time period for preventing the anode exhaust gas bleed until a second time limit is reached, where the bleed is then forced.

Additional features of the present invention will become apparent from the following description and appended claims, taken in conjunction with the accompanying drawings.

DETAILED DESCRIPTION OF THE EMBODIMENTS

Figure 1:
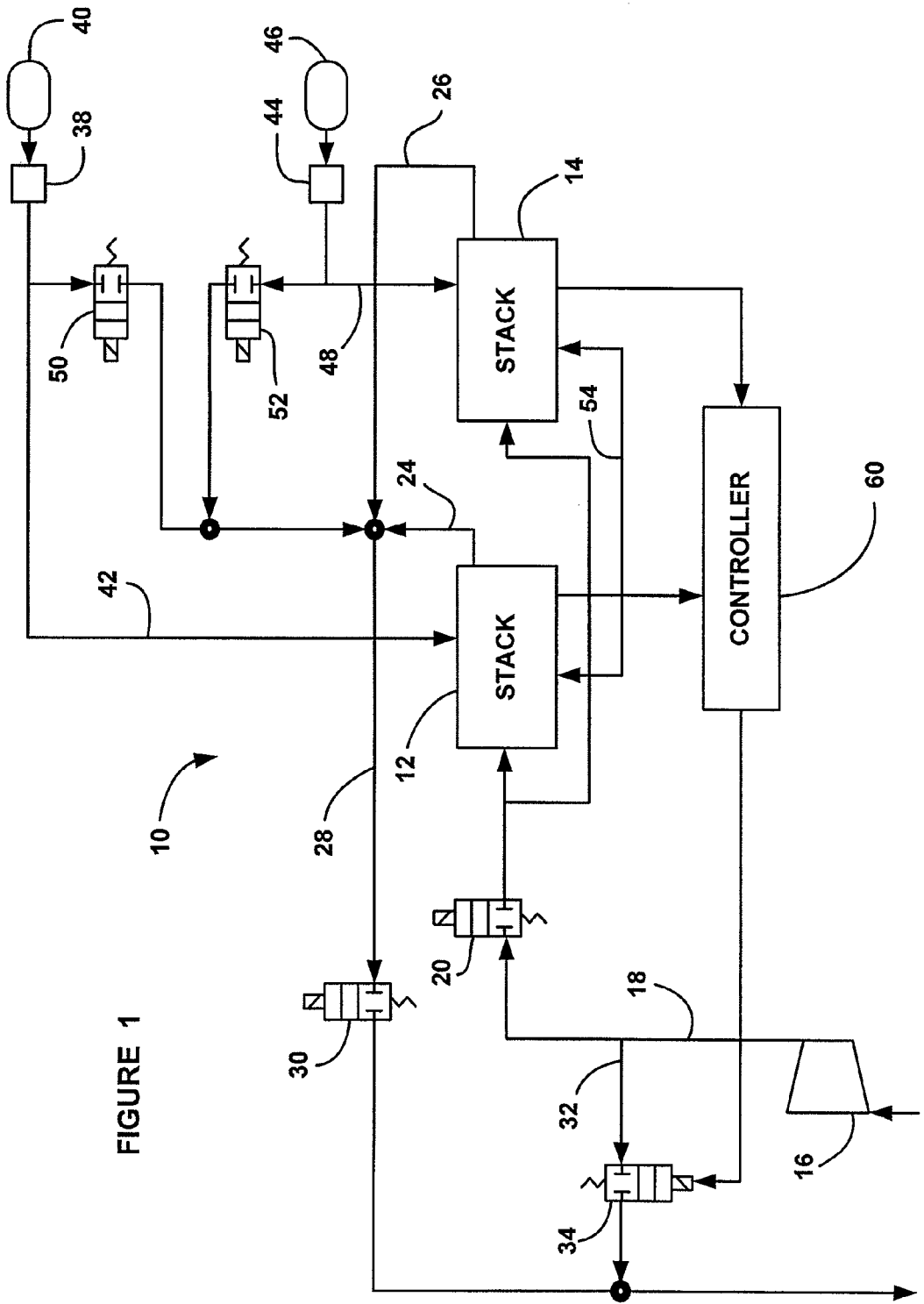
FIG. 1 is a schematic block diagram of a fuel cell system that employs an algorithm for controlling an anode exhaust gas bleed during power up-transients and cathode pulsing, according to an embodiment of the present invention.

The following discussion of the embodiments of the invention directed to a fuel cell system that employs an algorithm for controlling an anode exhaust gas bleed during power up-transients and cathode pulsing is merely exemplary in nature, and is in no way intended to limit the invention or its applications or uses.

FIG. 1 is a schematic block diagram of a fuel cell system 10 including a first split fuel cell stack 12 and a second split fuel cell stack 14. A compressor 16 provides cathode input air on cathode input line 18 to the split stacks 12 and 14 through a normally closed cathode input valve 20. Cathode exhaust gas is output from the split stack on line 24 and cathode exhaust gas is output from the split stack 14 on line 26 where the cathode exhaust gas is combined into a single cathode output line 28. A normally closed cathode back pressure valve 30 controls the flow of the cathode exhaust gas through the line 28. A cathode by-pass line 32 provided between the input line 18 and the output line 28 allows the cathode input air to by-pass the stacks 12 and 14. A normally closed by-pass valve 34 controls whether the cathode air by-passes the stacks 12 and 14. If the valve 34 is open, then air from the compressor 16 will by-pass the stacks 12 and 14. The valve 34 can be controlled so that a portion of the compressor air by-passes the stacks 12 and 14 and a portion of the compressor air goes through the stacks 12 and 14.

In this non-limiting embodiment, the split stacks 12 and 14 employ anode flow shifting where the anode reactant gas flows back and forth through the split stacks 12 and 14 at a predetermined cycle in a manner that is well understood to those skilled in the art. An injector 38 injects hydrogen gas from a hydrogen gas source 40 through anode line 42 to the split stack 12 and an injector 44 injects hydrogen gas from a hydrogen source 46 through anode line 48 to the split stack 14 in an alternating sequence. The anode flow shifting is cycled back and forth at a predetermined duty cycle, where only one of the injectors 38 or 44 is injecting hydrogen into the stack 12 or 14 at any given time. Hydrogen gas flowing into the stack 12 flows through a connector line 54 to the stack 14 and into the anode line 48. Likewise, hydrogen gas flowing into the stack 14 flows through the connector line 54 to the stack 12 and into the anode line 42.

As discussed above, nitrogen cross-over from the cathode side of the fuel cell stacks 12 and 14 dilutes the hydrogen gas in the anode side that affects stack performance. Therefore, it is necessary to periodically bleed the anode exhaust gas to reduce the amount of nitrogen in the anode side of the stacks 12 and 14. When the system 10 determines that a nitrogen bleed is necessary, it will open either a bleed valve 50 or a bleed valve 52 depending on which injector 38 or 44 is currently operational. Particularly, if the injector 38 is on, then the valve 52 is opened and the valve 50 is closed so that anode exhaust gas flowing through the line 48, flows through the valve 52 and into the cathode exhaust gas line 28. Likewise, if the injector 44 is on, the valve 50 is opened and the valve 52 is closed so that the anode exhaust gas flowing out of the stack 12 on the line 42 flows through the valve 50 and into the cathode exhaust line 28. In certain fuel cell system designs, it is desirable to maintain the percentage of hydrogen in the mixed anode and cathode exhaust gas to be less than 2% by volume, between 2% and 4% by volume for only a few seconds, and never more than 4% by volume.

During low power or low stack load operating conditions, the by-pass valve 34 is typically opened or partially opened so some of the airflow from the compressor 16 flows through the valve 34, and bypasses the stacks 12 and 14. Maintaining the valve 34 at least partially open is desirable to prevent compressor surge. Therefore, there is typically enough air in the cathode exhaust line 28 to dilute any hydrogen to below the desired percentage that may be bled from the anode side of the stacks 12 and 14 through the valves 50 and 52. However, during a power up-transient, such as from idle to 20 KW, all of the compressor air is needed by the stacks 12 and 14 to meet the power demand. A power up-transient can be defined in any suitable manner as a predetermined increase in stack load at a certain rate. Therefore, the by-pass valve 34 is closed during the power up-transient. However, at the time of the power up-transient, any hydrogen that was previously bled into the line 28 will not be diluted because air was redirected to the stacks 12 and 14.

The system 10 includes a controller 60 that controls the various valves, injectors, compressor, etc. within the system 10. The controller 60 receives a power output signal from the stacks 12 and 14. The controller 60 uses the various inputs, and generally the driver throttle input, as inputs to a complex algorithm to determine an airflow set-point of the cathode airflow to the stacks 12 and 14 from the compressor 16. Further, the controller 60 monitors the rate that the by-pass valve 34 is closing.

The present invention proposes an algorithm that detects cathode pulsing and power up-transients, and pauses the anode exhaust gas bleed command for a short period of time to limit hydrogen in the exhaust gas. To detect power up-transients or cathode pulsing, the algorithm monitors the rate of closure of the by-pass valve 34 and the rate of increase of the airflow set-point command to the compressor 16. If the controller 60 determines that the by-pass valve 34 is closing at a rate above a predetermined threshold and the compressor airflow set-point is increasing at a rate above a predetermined threshold, then the controller 60 knows that a power up-transient is occurring, where there may not be enough air in the cathode exhaust gas to dilute the hydrogen during an anode side bleed. Therefore, the controller 60 prevents an anode exhaust gas bleed for a predetermined period of time after the power up-transient has been detected so that the amount of hydrogen in the exhaust gas does not exceed the maximum limit. In one non-limiting example, the time that the anode exhaust gas bleed is prevented is about three seconds. After the predetermined period of time has passed, the power up-transient should have been satisfied where the by-pass valve 34 is now open enough where an exhaust gas bleed can safely occur. Thus, even if the algorithm used to determine that an anode exhaust gas bleed is necessary, the system 10 will prevent the bleed for the predetermined period of time.

During certain operating conditions, the stacks 12 and 14 may be responding to cathode pulsing where power up-transients are occurring at regular intervals as a result of the vehicle operator pushing on the throttle, releasing the throttle, pushing on the throttle, etc. If the system 10 detects that the by-pass valve 34 is again closing at a predetermined rate above a certain threshold and the airflow set-point is increasing at a predetermined rate during the bleed prevention time period, then the controller 60 will know that another power up-transient is occurring, and will reset the time for preventing the anode exhaust gas bleed to the predetermined time. This process may be continued until a second predetermined time period has elapsed, such as 20 seconds, where thereafter an anode exhaust gas bleed must be performed to prevent damage to the stacks 12 and 14. The second time would depend on the current density being produced by the stacks 12 and 14, where low stack current densities would be able to accept a longer time with no anode exhaust gas bleed without stack damage than higher current densities.

As mentioned above, algorithms are employed to determine the rate of nitrogen cross-over through the membranes from the cathode side to the anode side. These algorithms are then used to calculate when there is too much nitrogen on the anode side of the stacks 12 and 14 so that an anode exhaust gas bleed can be performed. This is referred to as proactive nitrogen bleeding. The controller 60 monitors the cell voltages of the individual cells in the stacks 12 and 14, and a difference between a minimum cell voltage and a maximum cell voltage in each stack 12 and 14 is periodically calculated. Further, an average cell voltage is calculated for both the cells in the stacks 12 and 14. If the difference between the minimum cell voltage and the maximum cell voltage for either stack 12 and 14 is great enough, or if the difference between the average cell voltage between the two stacks 12 and 14 is great enough, it is an indication that there is stack instability. One major cause of stack instability is nitrogen cross-over into the anode side of the fuel cell stacks 12 and 14. Therefore, algorithms are employed to command an anode exhaust gas bleed if the minimum to maximum cell voltage threshold is passed or the threshold between the averages of the cell voltages between the stacks 12 and 14 is passed. This is referred to as a reactive anode exhaust gas bleeding. The method of the invention delays the anode exhaust gas bleed for both reactive and proactive bleeds.

Through experimentation, it has been found that noise may be on the various signals due to driver input, i.e., tapping on the accelerator, or driving over a bumpy road, or controller action. It is therefore necessary to filter these signals because noise in the signal will falsely activate the up-transient condition causing the bleed to pause. Pausing the bleed command for too long would allow nitrogen to build up in the anode side of the stacks 12 and 14, thus causing stack cell voltage instability.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
at least one fuel cell stack;
a compressor providing cathode input air to a cathode side of the fuel cell stack;
a by-pass valve for allowing the cathode input air to by-pass the fuel cell stack on a by-pass line;
an anode exhaust gas bleed valve for bleeding anode exhaust gas from the stack, wherein the bled anode exhaust gas is mixed with cathode exhaust gas; and
a controller configured to control the anode exhaust gas bleed, said controller monitoring a closing rate of the by-pass valve and an increase of the airflow from the compressor, wherein if the closing rate of the by-pass valve and the rate of increase of the airflow exceeds predetermined thresholds, the controller prevents a bleed command from being sent to the anode exhaust gas bleed valve for a first predetermined period of time.

2. The system according to claim 1 wherein the first predetermined time frame is about three seconds.

3. The system according to claim 1 wherein the controller prevents the bleed command for both a proactive anode exhaust gas bleed and a reactive anode exhaust gas bleed.

4. The system according to claim 1 wherein the at least one fuel cell stack is a first and a second split stack.

5. The system according to claim 4 wherein the system employs anode flow shifting.

6. The system according to claim 1 wherein the controller monitors the closing rate of the by-pass valve and the increase of the airflow from the compressor to determined whether the system is in a power up-transient.

7. The system according to claim 6 wherein the by-pass valve is at least partially open when the system is not in a power up-transient.

8. The system according to claim 1 wherein the controller resets the first predetermined period of time if the controller prevents a bleed command from being sent to the anode exhaust gas bleed valve, and then determines that the closing rate of the by-pass valve and the rate of increase of the airflow has again exceeded the predetermined thresholds during the first predetermined period of time.

9. The system according to claim 8 wherein if the accumulated time that the controller prevents a bleed command exceeds a second predetermined period of time, the controller will force the anode exhaust gas bleed.

10. The system according to claim 1 wherein the power up-transient is from an idle condition to more than 15 KW.

11. A fuel cell system comprising:
- at least one fuel cell stack;
- a compressor providing cathode input air to a cathode side of the fuel cell stack;
- a by-pass valve for allowing the cathode input air to by-pass the fuel cell stack on a by-pass line;
- an anode exhaust gas bleed valve for bleeding anode exhaust gas from the stack, wherein the bled anode exhaust gas is mixed with cathode exhaust gas; and
- a controller configured to control the anode exhaust gas bleed, said controller detecting a power up-transient and preventing a bleed command from being sent to the anode exhaust gas bleed valve for a first predetermined period of time if a power up-transient is detected.

12. The system according to claim 11 wherein the controller prevents the bleed command for both a proactive anode exhaust gas bleed and a reactive anode exhaust gas bleed.

13. The system according to claim 11 wherein the controller resets the first predetermined period of time if the controller prevents a bleed command from being sent to the anode exhaust gas bleed valve, and then determines that a different up-transient is occurring during the first predetermined period of time.

14. The system according to claim 13 wherein if the accumulated time that the controller prevents a bleed command exceeds a second predetermined period of time, the controller will force the anode exhaust gas bleed.

15. A fuel cell system comprising:
- a first split stack;
- a second split stack, wherein a cathode exhaust gas from the first and second split stacks are combined and wherein the system employs anode flow shifting for flowing a hydrogen input gas to the first and second split stacks;
- a compressor providing cathode input air to a cathode side of the first and second stacks;
- a by-pass valve for allowing the cathode input air to by-pass the first and second split stacks on a by-pass line;
- a first anode exhaust gas bleed valve for bleeding anode exhaust gas from the first split stack and a second anode exhaust gas bleed valve for bleeding anode exhaust gas from the first split stack, wherein the bled anode exhaust gas is mixed with the cathode exhaust gas; and
- a controller configured to control the anode exhaust gas bleed, said controller monitoring a closing rate of the by-pass valve and an increase of the airflow from the compressor to determine whether the system is in a power up-transient, wherein if the closing rate of the by-pass valve and the rate of increase of the airflow exceeds predetermined thresholds, the controller prevents a bleed command from being sent to the anode exhaust gas bleed valve for a first predetermined period of time.

16. The system according to claim 15 wherein the first predetermined time frame is about three seconds.

17. The system according to claim 15 wherein the controller prevents the bleed command for both a proactive anode exhaust gas bleed and a reactive anode exhaust gas bleed.

18. The system according to claim 15 wherein the controller resets the first predetermined period of time if the controller prevents a bleed command from being sent to the anode exhaust gas bleed valve, and then determines that the closing rate of the by-pass valve and the rate of increase of the air flow has again exceeded the predetermined thresholds during the first predetermined period of time.

19. The system according to claim 18 wherein if the accumulated time that the controller prevents a bleed command exceeds a second predetermined period of time, the controller will force the anode exhaust gas bleed.

* * * * *